Patented Mar. 27, 1928.

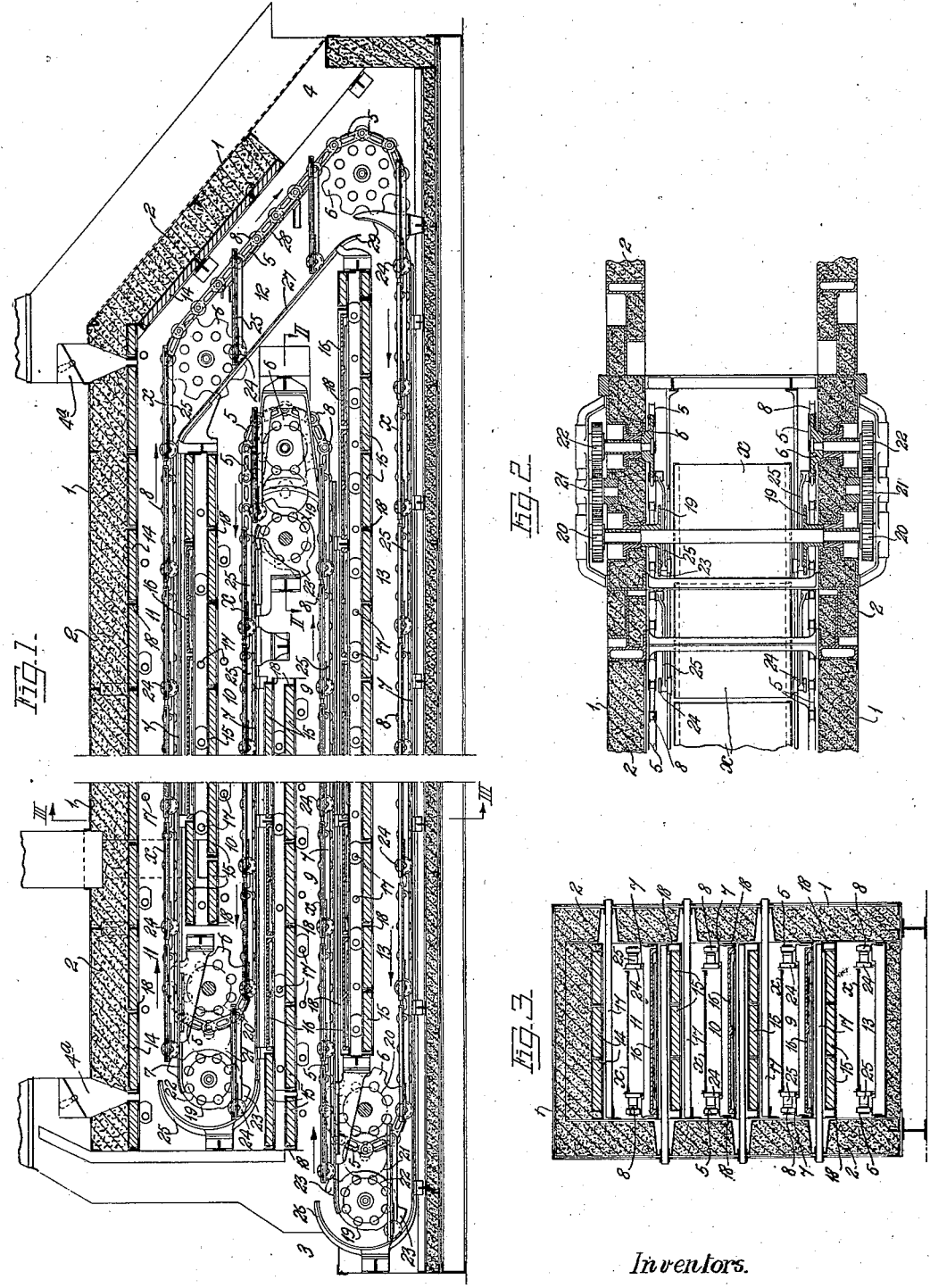

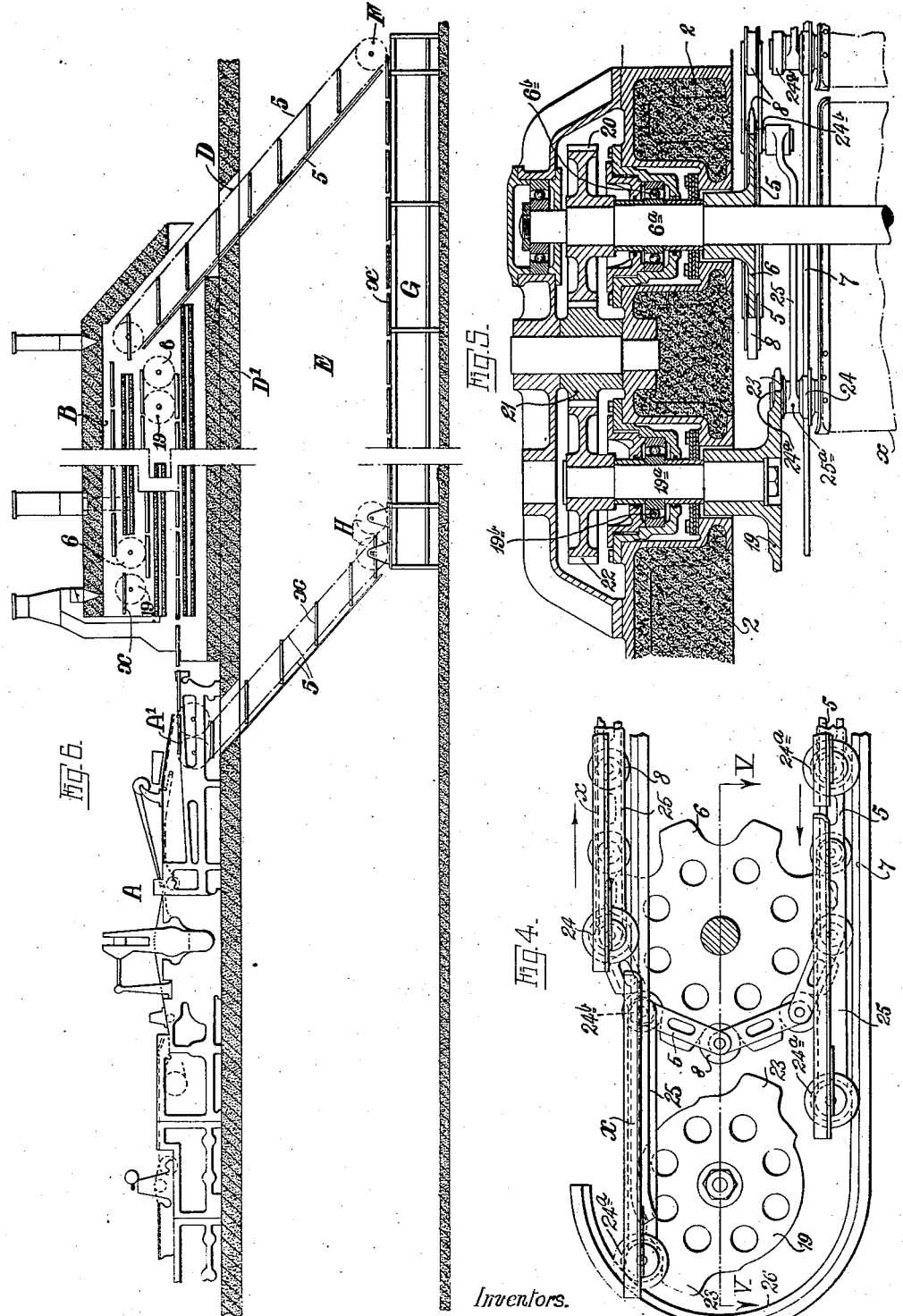

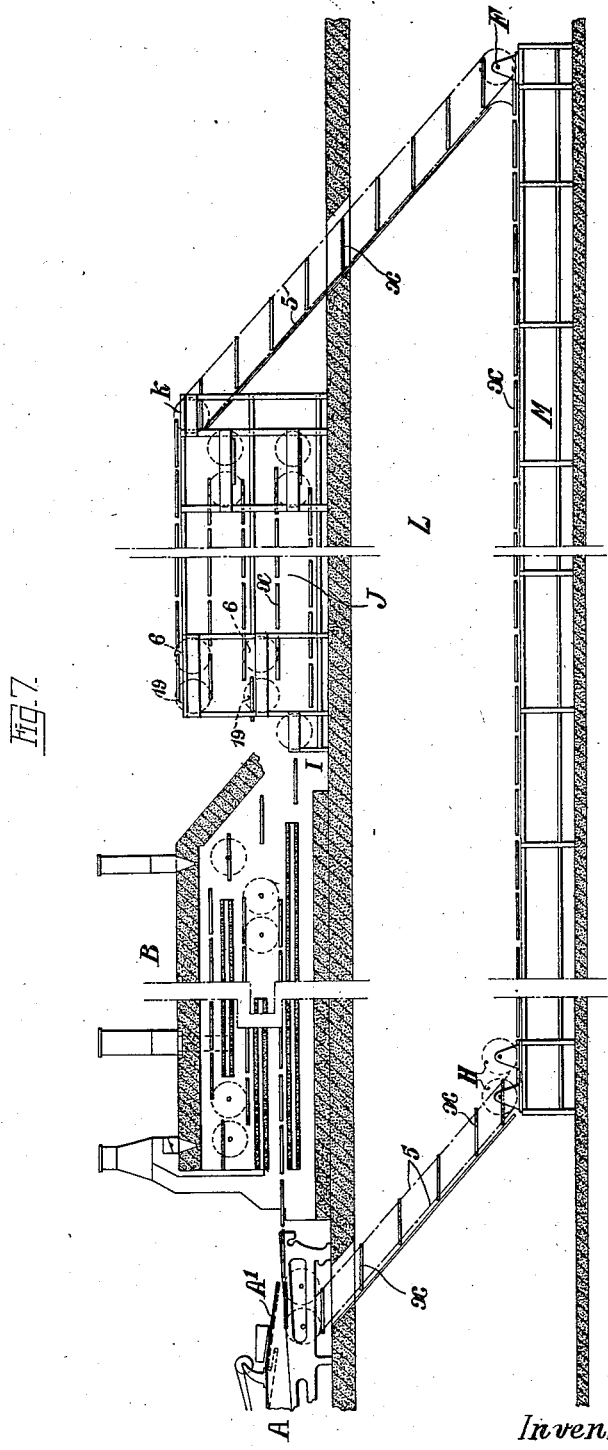

1,663,746

UNITED STATES PATENT OFFICE.

GEORGE RALPH BAKER AND CLAUDE DUMBLETON, OF LONDON, ENGLAND, ASSIGNORS TO BAKER-PERKINS COMPANY INCORPORATED, OF WHITE PLAINS, NEW YORK, A CORPORATION OF NEW YORK.

BAKING OVEN.

Application filed October 17, 1925, Serial No. 62,999, and in Great Britain November 14, 1924.

This invention relates to ovens, more particularly for baking biscuits and the like, in which the goods to be baked are carried on pans, trays or equivalents supported on conveyors, such as chains, which travel through the oven between the inlet and outlet thereof.

An object of the present invention is to provide an oven which occupies a minimum of space and in which the pan carriers and chains are so disposed that the heating elements, which may be of a known construction, can be located in any position above and below the goods during their passage through the oven in a circuitous path whereby the desired baking effect can be as readily obtained as in cases where the oven is of known construction, that is to say, in which the pans are carried on chains which move along a straight path in a substantially horizontal direction from the inlet to the outlet.

The pan carriers are arranged to support single pans of substantial size across the width of the oven, the chains supporting said carriers being continuous and arranged to pass in circuitous fashion in a number of superposed substantially horizontal courses or paths, for example three. The goods may be fed at the inlet onto the upper run of the lower course, then pass to the lower run of the upper course and finally to the upper run of said upper course from which they pass downwards to the base of the oven for discharge, or if preferred, the chains may be so arranged that the pans are carried first to the top of the oven and then travel by a circuitous route downwards to the delivery point. It is preferred that the feed and discharge openings be at the same level, but if desired the feed may be at the bottom and delivery at the top. Simple means may if desired then be provided for mechanical feed to and discharge from the oven and by arranging the courses of the carriers in circuitous fashion a minimum of space is required.

The pan carriers may also be arranged to carry empty pans back to the feed end of the oven and bring them up under the delivery end of an associated biscuit cutting or moulding machine. At this point the goods are fed directly into the pans which will pass through the oven as above described. At the delivery end of the oven the carriers would in this case pass out supporting the pans of baked goods and may then be moved through a cooling chamber also in circuitous fashion if desired. The goods are then removed from the pans by mechanical or other means and the empty pans return to receive a further charge of goods. The said pans may also be cleaned mechanically or otherwise and greased or treated as required during the return journey.

The mechanism can be so arranged that on the return run of the conveyor to the inlet of the oven the pans may be filled automatically by a device associated with the cutting or moulding machine or may be filled manually, the actual feed of the pans into the oven being also either automatic or manual.

The pans do not swing on the chains or extend below the plane thereof but remain in substantially the same plane as the chains during horizontal travel except when passing from one course to the next at the ends of the oven. By this means it is possible to bring the heating elements, which may be in the form of straight gas burners, close to the chains at each each side thereof, there being provided however if desired, porous tiles, bricks or the like preferably hollow, adjacent the burners, which thus become heated and equalize the baking heat over the whole surface of the goods at both sides. The height of the oven is by these means much reduced as compared with circuitous ovens of the vertical type or those in which the trays swing in relation to or are suspended from the chains.

Embodiments of ovens comprising the above stated features and in certain embodiments combined with cooling devices and biscuit cutting machines are represented in the accompanying drawings in which Fig. 1 is a longitudinal vertical section through the oven which is broken away at the centre; Fig. 2 is a partial horizontal section on the line II—II of Fig. 1; Fig. 3 is a vertical cross section on the line III—III of Fig. 1. Fig. 4 is a detail side elevation showing mechanism for controlling the pan carriers. Fig. 5 is a horizontal section on the line V—V of Fig. 4. Fig. 6 is a diagrammatic representation partly in section showing a plant comprising a biscuit cutting machine, an oven of the character above referred to and means for cooling the biscuits after leaving the oven and Fig. 7 is a similar view to Fig. 6 showing also a special cooling device communicating with the oven and in which the biscuits pass through a circuitous course similarly to the oven.

In said drawings and to first refer specifically to Figs. 1 to 5, 1 designates the casing of the oven comprising spaced members fitted with slag wool 2 or other insulating material as customary; 3 designates the inlet to and 4 the outlet from the oven; $4^a$ designates damper controlled outlets for gases of combustion and vapour arising from the baking goods. The chains 5 which are shown as continuous have between their links rollers 8 and pass in circuitous fashion about end sprockets 6 engaged by said rollers and together with pan carriers are guided as to their horizontal courses by rails 7 as hereinafter described.

The course of the chains in the example given is clearly shown in Fig. 1 by the arrows and as indicated in Fig. 2 said chains support single pans $x$ across the width of the oven. Thus in Fig. 1 three main horizontal chain courses are shown viz, commencing at the inlet 3 the goods are placed on pans carried by the upper run 9 of the lower course, then pass to an intermediate course 10 constituted by the lower run of the upper course, and then to the upper run 11 of said latter course, whence they pass downwards on an inclined run 12 to the outlet 4 where the goods are removed from the trays, the chains however passing back along the base of the oven at 13 to join the first run 9 aforesaid.

The invention is not however limited to this particular disposition of the chains since the same may be modified as previously mentioned, or in other appropriate manner, so long as the heating arrangements, now to be described, may be properly introduced above and below the goods to secure efficient heating during their passage through the oven, whilst ensuring a minimum space between the courses of the chains and a limited overall height of the oven commensurate with the course of the goods therethrough.

The oven may be lined as usual with tiles 14 and rows of heat radiating elements 15 such as spaced porous tiles, bricks, metal plates or the like are placed between the runs or courses of the chains 5. Certain of these tiles, viz, those indicated at 16, are preferably hollow or recessed and the heating elements, shown in the form of straight gas burner pipes 17 which extend transversely across the oven, are arranged between and in certain cases below said tiles and also above the upper chain run close to the roof tiles 14 as indicated, in such a manner that all said tiles become heated and equalize the baking temperature of the goods at both sides thereof or above and below the same. The tiles are supported by angle irons 18 suitably arranged according to their positions.

The overall height of the oven may be reduced to a minimum by maintaining the pans $x$ in horizontal position at all times instead of allowing them to swing, as in some forms of circuitous ovens, and for this purpose the chains as aforesaid pass about the end sprockets 6, and in order to maintain the pans in proper relation to the chains there is provided where required adjacent the end sprocket 6 a second sprocket 19 driven from the first as through a train of gears 20, 21, 22 to revolve in the same direction and provided with teeth 23, for example two, which are diametrically opposed and with which engage rollers $24^a$ on pivoted pan carriers.

The construction embodying the sprockets and pan carrier is more clearly shown in Figs. 4 and 5. Here it will be seen that the sprockets 6 and 19 with their associated gears 22 and 20 respectively are mounted on spindles $6^a$ and $19^a$ mounted in ball bearings $6^b$ and $19^b$ respectively carried by the side frame of the machine.

The sprockets 6 and 19 are not in alignment and the pan carrier comprises spaced arms 25 between which the pan $x$ is supported. Said arms, of which one only is shown in Fig. 5, are connected rigidly at one end to the frame carrying the pan by means of a boss $25^a$ which carries two rollers $24^a$ and 24, the former of which, as above stated, engages the sprocket 19 and the latter of which runs on the guide rail 7. The arms 25 extend forwardly from said rollers for a distance approximating to the length of the pan where at the forward end they are pivotally connected by means of a stub $24^b$ to the chain rollers 8 which engage the sprockets 6, the forward end of the pan being thus supported at all times. The rollers 24 of the carriers are held in proper position when passing about the sprockets 19 by curved guide members 26 forming extensions of the rails 7. By locating the two sprockets 6 and 19, one for the chain and the other for the pan carrier, at distances apart substantially corresponding to the length of the arms 25 of the carrier and by the means described of connecting said arms to the carrier and guiding them, the pans and their carriers are always in the same plane and the pans are so supported that as the chains move around the sprockets, the carriers are moved about pivotal points to always maintain them horizontal. It will further be noted that in passing about the curved ends of the courses the pans pass the centres of the additional sprockets 19 and that no parts of the pans or their carriers extend below the plane of the chains, which fact in contradistinction to known constructions, also tends to enable the height of the oven to be reduced to a minimum.

When the chains pass from the upper run 11 to the discharge 4 the pan carriers 25 are guided by spaced rails 27, 28 still in horizontal position and are thence guided by a curved member 29 to assume the lower run 13.

The same object may be realized by supporting the pan carriers with auxiliary guide chains as disclosed in Letters Patent No. 1,250,125 or by other means, but the above described method is the preferred one and constitutes an important feature of the present invention.

To now turn to Figure 6 of the drawings there is here shown a complete biscuit plant which embodies in combination a conventional form of biscuit cutting machine A from which the biscuits are charged by a reciprocating feed device $A^1$ on to the pans $x$ which are carried by continuous chains 5 arranged in circuitous fashion in the oven B as in the construction of Fig. 1 and the pan carriers of which are also similarly arranged.

In this construction however the continuous chains 5 leave below at D and extend through the floor $D^1$ to a separate cooling chamber E in which they pass about sprockets F and, together with the pans containing the baked biscuits, pass over a table G at which operatives stand to remove the baked biscuits from the pans to sort and pack them, and clean and grease the emptied pans which latter are then carried up again about other sprockets H to the biscuit cutting machine to receive a fresh batch of biscuits to be baked.

In the arrangement shown in Fig. 7, $A^1$ indicates the feed device of a similar biscuit cutting machine, and B the oven constructed as before with the continuous chains 5 passing therethrough in a circuitous path. The chains however pass out of the oven at I into the lower part of a cooling device J through which the chains also pass in circuitous fashion and which they ultimately leave above at K and extend thence downwards to a chamber L where they pass over a table M on which the biscuits are removed from the pans to be sorted and packed and on which the empty pans are cleaned and greased as in Fig. 6, the chains then passing back to the biscuit machine to receive a fresh batch. It is to be understood that in the cooling device J the chains with their pan carriers are arranged, constructed and guided in an exactly similar manner to that of the oven as fully explained above.

In certain cases it may be desirable to run the conveyor vertically to the packing or cooling chamber below the floor level where space is a consideration, in which case the use of auxiliary chains to maintain the trays and their carriers horizontal, may be necessary.

What we claim as our invention and desire to secure by Letters Patent of the United States is:—

1. A baking oven, having a conveyor embodying chains arranged in circuitous courses between the inlet and outlet of the oven, guides for said conveyor, pan carriers on the conveyor chains, and driving means for said chains including carrier-controlling sprockets; each carrier comprising a frame supporting the pan, spaced arms rigidly connected at one end to said frame and pivotally connected at the opposite end to the conveyor chains, and two pairs of rollers carried by the rear end of the carrier, one pair adapted to run on the guides and the other pair over said controlling sprockets.

2. A baking oven, having a travelling conveyor which extends from the inlet to the outlet in a circuitous path, guides for the conveyor, pan carriers on the conveyor, and driving means for said conveyor including rotary carrier-controlling elements; each carrier comprising a frame, spaced arms disposed parallel with the frame and the conveyor and rigidly connected at one end to the former, the other end of said arms being pivotally connected with the conveyor, and a plurality of rollers mounted at the rear end of the carrier, certain rollers adapted to travel along said guides and certain others adapted to travel over said rotary controlling elements.

3. A baking oven, having a travelling conveyor which extends from the inlet to the outlet in a circuitous path, guides for the conveyor, pan carriers on the conveyor, and driving means for said conveyor including carrier-controlling sprockets; each carrier comprising a frame, spaced arms disposed parallel with the frame and the conveyor and rigidly connected at one end to the former, the other end of said arms being pivotally connected with the conveyor, and two pair of rollers at the rear end of the carrier, one pair adapted to travel along said guides and the other pair over said sprockets.

4. A baking plant, comprising in combination a dough separating machine, an oven having its inlet in line with said machine, a cooling chamber below the oven and containing an elongated table, heat-insulating means separating the oven from the cooling chamber, and a single endless conveyor adapted to travel in a closed path from the separating machine, through said oven inlet, into and through the oven, then downwardly into and through said cooling chamber and over the table therein, and then upwardly back to said separating machine.

5. A baking plant, comprising in combination a dough separating machine, an oven having its inlet in line with said machine, a heat-insulating partition below said oven having openings for the passage of a conveyor, a cooling chamber below the said partition and containing an elongated table, and a single endless conveyor adapted to travel in a closed path from the separating machine through said oven inlet, into and through the oven, then downwardly through said partition openings into and through said cooling chamber and over the table therein, and then upwardly back through said partition to said separating machine.

6. A baking oven having a single travelling conveyor extending from the inlet to the outlet thereof in a circuitous path, a cooling chamber, and a heat-insulating partition between the oven and the cooling chamber; the conveyor extending from the oven through said partition and through said cooling chamber in a continuous and circuitous fashion, said conveyor passing from the exit of the cooling chamber again through the partition to the inlet of the oven.

7. A baking plant comprising in combination, a dough separating machine, an oven, a single continuous conveyor supporting pans receiving the separated dough delivered by said machine, said conveyor extending through the oven in a circuitous path from inlet to outlet thereof, a cooling chamber through which said conveyor also passes in a circuitous path, said conveyor being adapted to carry pans emptied of their contents back to the inlet of the oven adjacent the delivery end of the dough separating machine, and a heat-insulating partition between the oven and cooling chamber whereby the latter is shielded from heat radiated from the oven.

In witness whereof we have signed this specification.

GEORGE RALPH BAKER.
CLAUDE DUMBLETON.